(12) United States Patent
Murakami

(10) Patent No.: US 7,102,256 B2
(45) Date of Patent: Sep. 5, 2006

(54) DISTRIBUTION LINE STRUCTURE FOR ELECTRIC POWER SUPPLY

(75) Inventor: Yoshinori Murakami, Tokyo (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 427 days.

(21) Appl. No.: 10/290,503

(22) Filed: Nov. 8, 2002

(65) Prior Publication Data

US 2003/0090160 A1 May 15, 2003

(30) Foreign Application Priority Data

Nov. 9, 2001 (JP) ............. P 2001-344545

(51) Int. Cl.
- *H01B 5/02* (2006.01)
- *H02G 5/00* (2006.01)
- *H02G 5/02* (2006.01)
- *H01B 7/08* (2006.01)

(52) U.S. Cl. ............. 307/147; 174/117 F; 174/117 FF; 174/129 B; 174/129 R; 174/133 B; 174/133 R

(58) Field of Classification Search ............ 174/133 B, 174/129 B, 129 R, 133 R, 117 F, 117 FF; 307/147

See application file for complete search history.

(56) References Cited

U.S. PATENT DOCUMENTS

| 5,422,440 | A | 6/1995 | Palma ................. 174/133 |
| 5,866,850 | A | 2/1999 | Kobayashi ............ 174/98 |
| 5,872,711 | A | 2/1999 | Janko ................. 363/144 |
| 2002/0009919 | A1 * | 1/2002 | Yamanishi et al. ..... 439/425 |
| 2005/0078463 | A1 * | 4/2005 | Chheda et al. ........ 361/789 |

FOREIGN PATENT DOCUMENTS

| JP | 60-047306 | 3/1985 |
| JP | 07-114826 | 5/1995 |

* cited by examiner

Primary Examiner—Brian Sircus
Assistant Examiner—Hal I. Kaplan
(74) Attorney, Agent, or Firm—McDermott Will & Emery LLP

(57) ABSTRACT

A distribution line structure for electric power supply is provided with a pair of first conductors and a second conductor. Each of the first conductors is provided with a first main portion formed in a flat strip shape and first connection portions, and the second conductor is provided with a second main portion formed in a flat strip shape and second connection portions. The first conductors are connected with each other at the first connection portions. The first and second main portions are layered and separated each other by insulators. The second main portion is put between the first main portions.

18 Claims, 18 Drawing Sheets

DISTRIBUTION LINE STRUCTURE FOR ELECTRIC POWER SUPPLY

BACKGROUND OF THE INVENTION

1. Field of the Invention

The present invention relates to a distribution line structure for supplying electric power to an electric load such as a three-phase motor.

2. Description of the Related Art

There is proposed a distribution line structure for an electric power line which is provided with a pair of conductor sheets and an insulator sheet put therebetween An electric load is connected with one end thereof and electric power is supplied from another end thereof. The pair of conductor sheets are positioned in close vicinity to each other and respectively conduct counter electric currents. Thereby magnetic fluxes respectively induced by the electric currents are mutually eliminated so that inductance of the conductors is minimized. A related art is disclosed in Japanese Patent Application Laid-open 7-114826.

SUMMARY OF THE INVENTION

According to the distribution line structure described above, an electromagnetic field leakage is still considerable. Even when a direct current is conducted, in a case where a high frequency current is superposed to the direct current or the direct current is suddenly changed, considerable electromagnetic wave is radiated so that neighbor apparatuses are influenced and sometimes malfunction.

A purpose of the present invention is to solve the problem. The present invention provides some types of distribution line structures which has eliminated electromagnetic wave radiation and is not easy to cause electromagnetic interference on neighbor apparatuses.

According to a first aspect of the present invention, the distribution line structure is provided with a pair of first conductors and a second conductor. Each of the first conductors is provided with a first main portion formed in a flat strip shape and first connection portions, and the second conductor is provided with a second main portion formed in a flat strip shape and second connection portions. The first conductors are connected with each other at the first connection portions. The first and second main portions are layered and electrically insulated from each other. The second main portion is put between the first main portions.

According to a second aspect of the present invention, the distribution line structure is provided with a pair of first conductors, a pair of second conductors and a third conductor. Each of the first conductors is provided with a first main portion formed in a flat strip shape and first connection portions, and the first conductors are connected with each other at the first connection portions. Each of the second conductors is provided with a second main portion formed in a flat strip shape and second connection portions, and the second conductors are connected with each other at the second connection portions. The third conductor is provided with a third main portion formed in a flat strip shape and third connection portions. The first, second and third main portions are layered and electrically insulated from each other. The second main portions are aligned on both sides of the third main portion. The second and third main portions are put between the first main portions so as to be layered. The first and second conductors are connected with a direct current power source and the third conductor is connected with a load.

According to a third aspect of the present invention, the distribution line structure is basically as same as the second aspect though the second and third conductors are connected with the direct current power source and the first conductor is connected with the load.

According to a fourth aspect of the present invention, the distribution line structure is basically as same as the second aspect though the first and third conductors are connected with the direct current power source and the second conductors are connected with the load.

According to a fifth aspect of the present invention, the distribution line structure is further provided with a fourth conductor including a fourth main portion formed in a flat strip shape and fourth connection portions. The fourth main portion is put between the third main portion and one of the second main portions and sandwiched by the first main portions. The first, second, third and fourth main portions are formed in flat strips and electrically insulated from each other.

According to a sixth aspect of the present invention, the distribution line structure is further provided with a fifth conductor including a fifth main portion formed in a flat strip shape and fifth connection portions. The fifth main portion is put between the third or fourth main portion and one of the second main portions and sandwiched by the first main portions. The first, second, third, fourth and fifth main portions are formed in flat strips and electrically insulated from each other.

According to a seventh aspect of the present invention, the distribution line structure is provided with a first conductor including a first main portion formed in a flat strip shape and first connection portions, a second conductor and a third conductor including a third main portion formed in a flat strip shape and third connection portions. The first and the third main portions are layered. The second conductor enfolds the third main portion so as to be connected with the first main portion. The third conductor is electrically insulated from the first and second conductors.

According to the seventh aspect of the present invention, the distribution line structure has the same effects as the first aspect as well as electromagnetic wave radiation is further suppressed.

According to an eighth aspect of the present invention, the distribution line structure is provided with a first conductor including a first main portion formed in a flat strip shape and first connection portions, a second conductor, a third conductors including a third main portion formed in a flat strip shape and third connection portions and a fourth conductor including a fourth main portion formed in a flat strip shape and fourth connection portions. The first, third and fourth main portions are layered and electrically insulated from each other. The second conductor enfolds the third and fourth main portions so as to be connected with the first main portion. The first, second and fourth conductors are connected with the direct current power source. The third conductor is connected with the load.

According to the eighth aspect of the present invention, the distribution line structure has an excellent productivity as well as the same effect as the structures described above.

DETAILED DESCRIPTION OF THE PREFERRED EMBODIMENT

Figure 1:
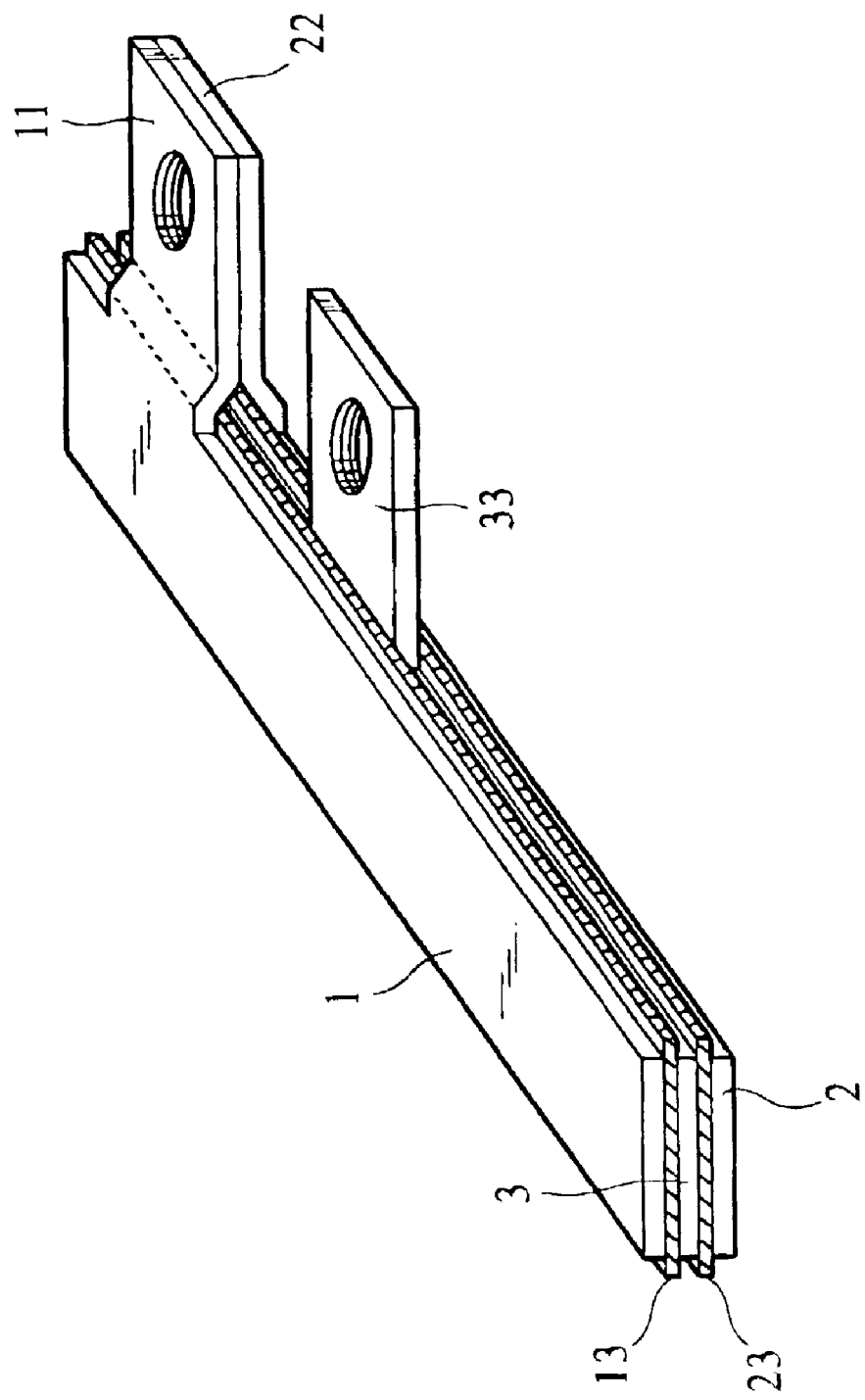
FIG. 1 is a perspective view of a distribution line structure according to a first embodiment of the present invention.

Certain embodiments of the present invention will be described hereinafter. Throughout the drawings and the specification, substantially the same elements are referred to the same reference numerals or characters. Reference characters "A" and "B" shown in FIGS. 3, 6, 10, 13 and 14 we representative of points, which are the nearest to each other on respective edges of conductors.

The first embodiment of the present invention will be described hereinafter with reference to FIGS. 1–21.

The distribution line structure is provided with a pair of first conductors 1 and 2 and a second conductor 3. The first conductors 1 and 2 conduct an electric current and the second conductor 3 conducts a counter electric current thereof. The first and second conductors 1, 2 and 3 are made of conductive material such as copper and are formed in flat strips and layered, as shown in FIGS. 1–3.

The distribution line structure is further provided with insulator layers 13 and 23. The insulator layer 13 is put between the first conductor 1 and the second conductor 2 and the insulator layer 23 is put between the second conductor 2 and the first conductor 3. The insulator layers 13 and 23 are made of insulative material such as mica based insulator or insulative resin. The insulator layers 13 and 23 are formed certainly wider than the conductors 1, 2 and 3 so as to prevent a discharge between peripheral surfaces thereof.

The distribution line structure is provided with connection portions at both ends thereof to connect with a power supply and an electric load. An embodiment of such a connection portion is shown in the upper right corner of FIG. 1. The connection portions have screw holes for electric connections. The connection portions 11, 22 and 33 are respectively connected with the conductors 1, 2 and 3. The conductors 1 and 3 are electrically in contact with each other at the connection portions 11 and 33. The opposite end not shown in FIG. 1 has the same structure.

Figure 2:
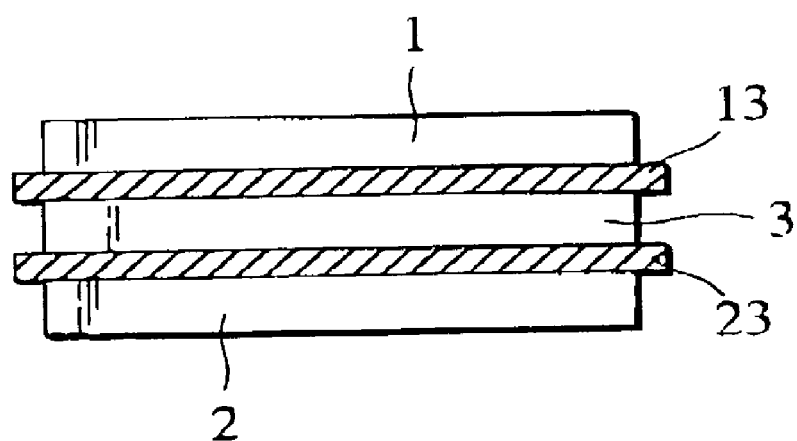
FIG. 2 is a cross-sectional view of the distribution line structure.
Figure 3:
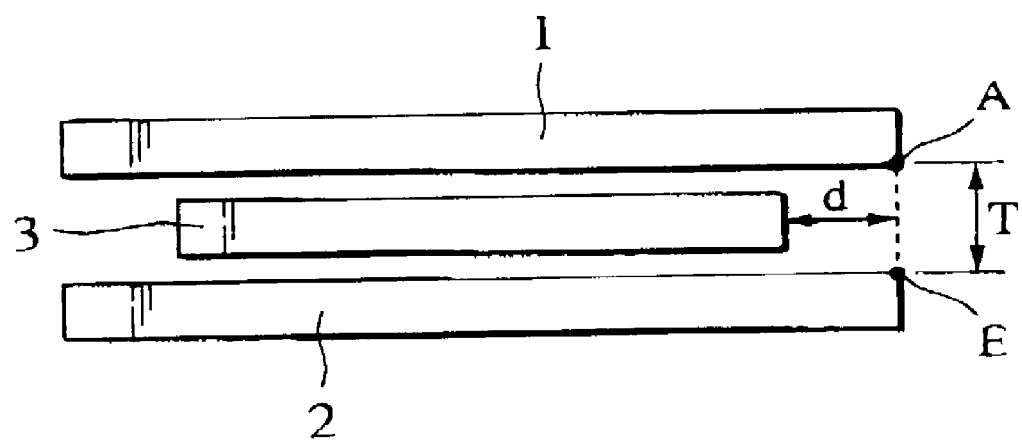
FIG. 3 is a cross-sectional view of the distribution line structure according to a first modification of the first embodiment in which the insulator layers are not shown.

The three conductors 1, 2 and 3 are layered in a manner that the edges thereof are made flush as shown in FIG. 2. Sizes of the conductors are exemplified as follows, in a case where a current of several hundreds A is conducted, thickness is 2 mm and width is 20 mm. Such a distribution line structure may have a reduced inductance as compared with any conventional structure.

The conductors 1, 2 and 3 may be modified as shown in FIG. 3. The edge of the conductor 3 is slightly recessed from the edges of the conductors 1 and 2. The distribution line structure of the first modification eliminates an electromagnetic field intensity around the distribution line edge.

Figure 4:
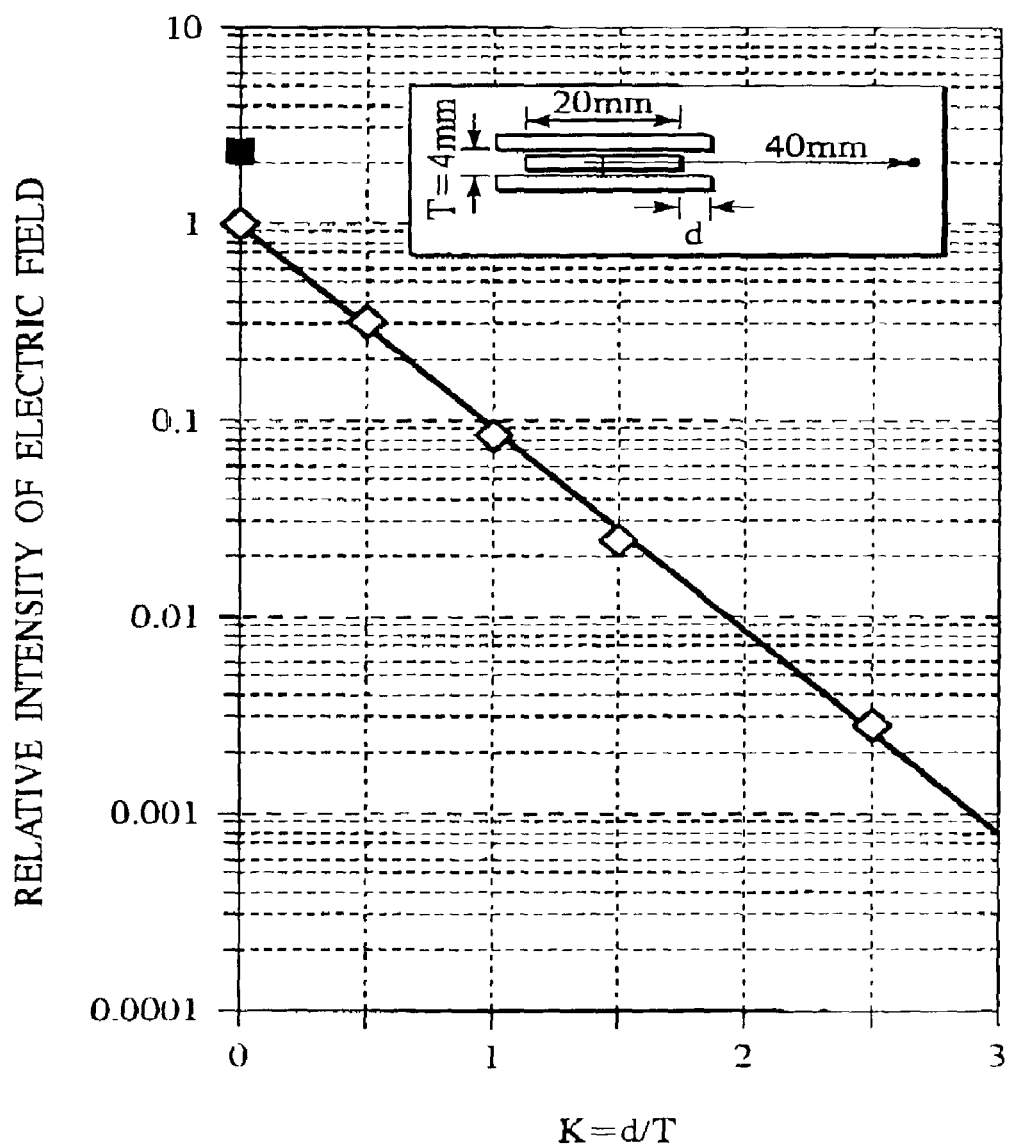
FIG. 4 is a graph showing an effect of the first embodiment of the present invention.

An elimination effect of the field intensity is calculated as shown in FIG. 4. The vertical scale is a relative intensity of the electromagnetic field and the horizontal scale K is described later. When a distance between the conductors 1 and 2 is T, a receding distance of the edge of the conductor 3 from the edges of the conductors 1 and 2 is d, K is defined to be d/T.

The calculation is done assuming that the distribution line structure is symmetrical. Numerical assumptions are as follows; the width of the conductor 3 is 20 mm, the thickness of the conductor 3 is 2 mm, the thickness of the insulator layers is 1 mm, and the thicknesses of the conductors 1 and 2 both are 1 mm. Both the edges of the conductor 3 are recessed from the edges of the conductors 1 and 2 in distance d. Each values of the vertical scale for respective K values is calculated as a ratio of an electric field intensity at a point 40 mm away from the center of the conductor 3 in a direction parallel thereto to a corresponding electric field intensity in a case of K=0, that is, the edges of the three conductors are made flush as shown in FIG. 2.

An electromagnetic field intensity of an electromagnetic wave can be discussed by dealing with an electric field intensity thereof because they are in proportion The open diamonds in FIG. 4 show the calculated relative electric field and the solid square shows a corresponding relative electric field according to the proposed structure assuming that the width of the conductors is 20 mm and the other sizes are the same as the present invention. The values according to the present invention are no more than 1 even though the corresponding value of the proposed structure is more than 2. Accordingly, the electric field intensity around the conductors of the present invention is less than half of one of the proposed structure. When K=0.25, namely, d=1 in the case, the calculated value is reduced by approximately half in comparison with the case when K=0. More specifically, when the value d is more than ¼ of the value of T, the electric field intensity can be less than half that of the case when K=0 (the edges of the conductors are made flush). Furthermore, the value can be ¹⁄₁₀ when K=1 (namely, d=4 mm) and the value can be ¹⁄₁₀₀ when K=2 (namely, d=8 mm). Similar tendencies are displayed at any points where the relative electric fields are measured around the conductor 3.

Figure 5:
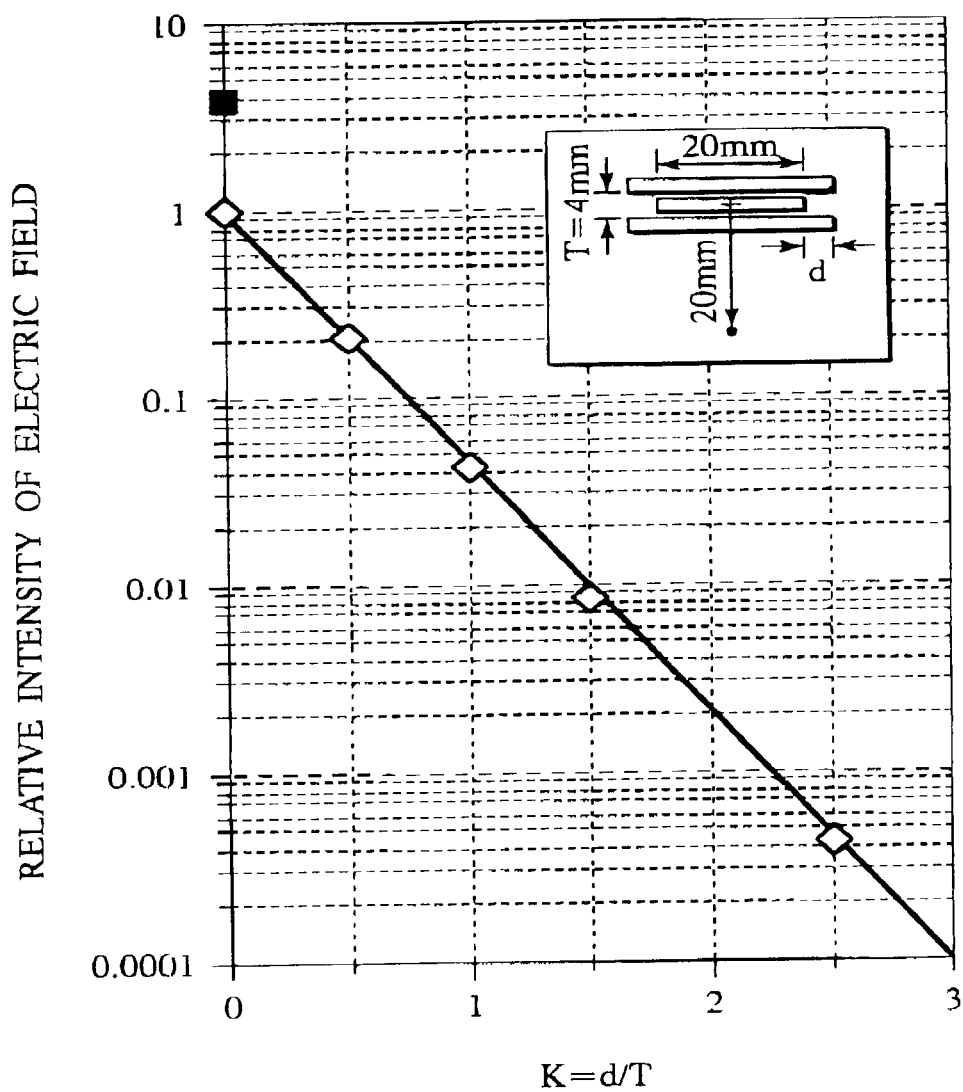
FIG. 5 is another graph showing an effect of the first embodiment of the present invention.

FIG. 5 shows a calculation result of an electric field intensity at a point 20 mm away from the center of the conductor 3 in a direction perpendicular thereto. The vertical scale is calculated as a ratio of a relative intensity to a corresponding electric field intensity in a case of K=0, as in FIG. 4. The solid square shows a calculated relative electric field according to the double structure of the proposed distribution line structure and the open diamonds show calculated values of the present invention The value of the proposed structure is about 4 and the value of the present invention is about 1 when K=0. Accordingly, the intensity of the electric field leaked in a direction perpendicular to the conductors of the present invention is reduced to be less than a quarter of that of the proposed structure. The electric field intensity in the direction perpendicular to the conductors is dependent on the width of the conductors as well as d and T values. Further, the electric field intensity in a case of K=0.25 (namely, d=1 mm in the case) is about half of that in a case of K=0. The electric field intensity in a case of K=0.75 (namely, d=3 mm in the case) is about ¹⁄₁₀ of that in a case of K=0, and that in a case of K=1.5 (namely, d 6 mm) is about ¹⁄₁₀₀.

To minimize electromagnetic interference on neighbor apparatuses, some attempts, for example, employing a coil, a capacitor or a ferrite core, have been made so as to prevent overlaying of high frequency noise to a direct current. According to the present invention, the distribution line structure in itself prevents leaking of an electromagnetic field. Thereby it is possible to omit a coil or such or make them compact so that the power supply system can be made compact and the cost can be saved.

Furthermore, the system is uneasy to get electromagnetic interference from an external electromagnetic wave because efficiencies of transmission and reception are equivalent as the antenna engineering teaches.

Figure 6:
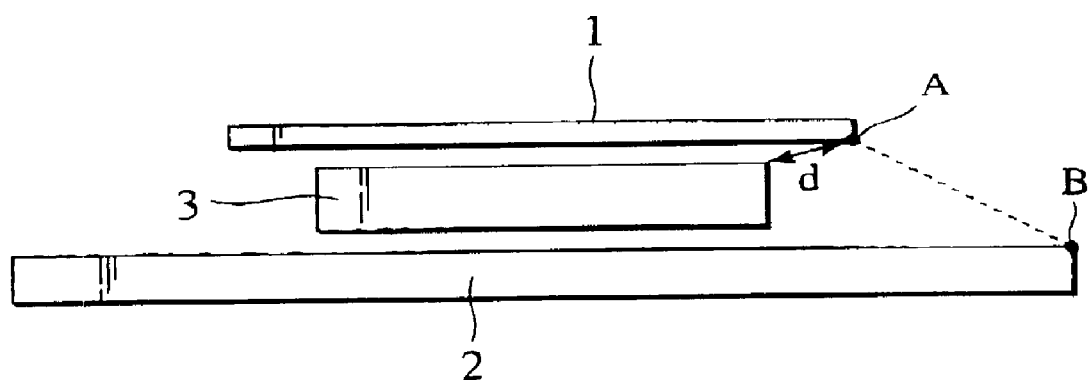
FIG. 6 is a cross-sectional view of the distribution line structure according to a second modification of the first embodiment in which the insulator layers are not shown.

Though The edges of the conductors 1 and 2 are symmetrically projected in FIG. 3, they may be formed in asymmetric shape as shown in FIG. 6. In such a case, the electric field around the conductors is asymmetric but may be calculated assuming d value is coincide with the smaller one.

Figure 7:
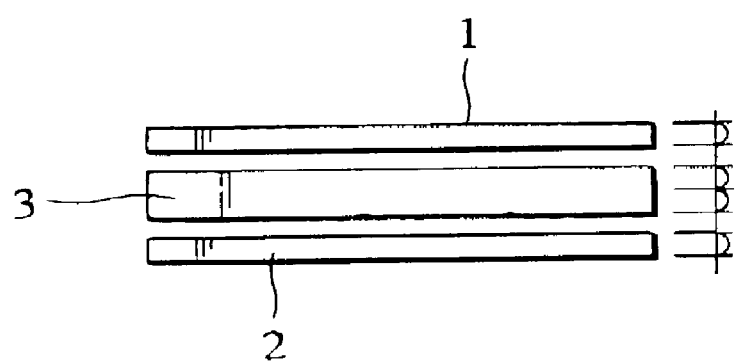
FIG. 7 is a cross-sectional view of the distribution line structure according to a third modification of the first embodiment in which the insulator layers are nor shown.

The three conductors in FIG. 1 have the same cross-sectional shapes. Such a constitution provides a good productivity because the three conductors are made of a single material sheet and the respective material sheets are not necessary. Considering an optimization of the electric power loss and the amount of used material, the three conductors may be constituted as shown in FIG. 7. The first conductors 1 and 2 have half a thickness as the second conductor 3 so that the values of electric resistance per unit length thereof are uniform. Further, the amount of the used material is minimized. Furthermore, the first and second conductors 1, 2 and 3 need not have the same width. Any shape may be employed under a condition that a total cross-sectional area of the first conductors 1 and 2 is substantially the same as one of the second conductor 3.

The first conductors 1 and 2 may be formed in thinner shape than those described above when formed wider than the second conductor 3. Further, a total cross-sectional area of the first conductors 1 and 2 is slightly smaller than the second conductor 3 so that the distribution line structure has a better heat radiation.

Next, the connection portions of the distribution line structure of the present invention will be described hereinafter. A typical embodiment of the connection portions is shown in FIG. 1. According to the structure shown in FIG. 1, the first conductors 1 and 2 are separated from the second conductor 3 at, the connection portions so that electromagnetic wave radiation therefrom is not prevented. If it is intended to suppress such a radiation, a structure shown in FIG. 8, is preferred.

Figure 8:
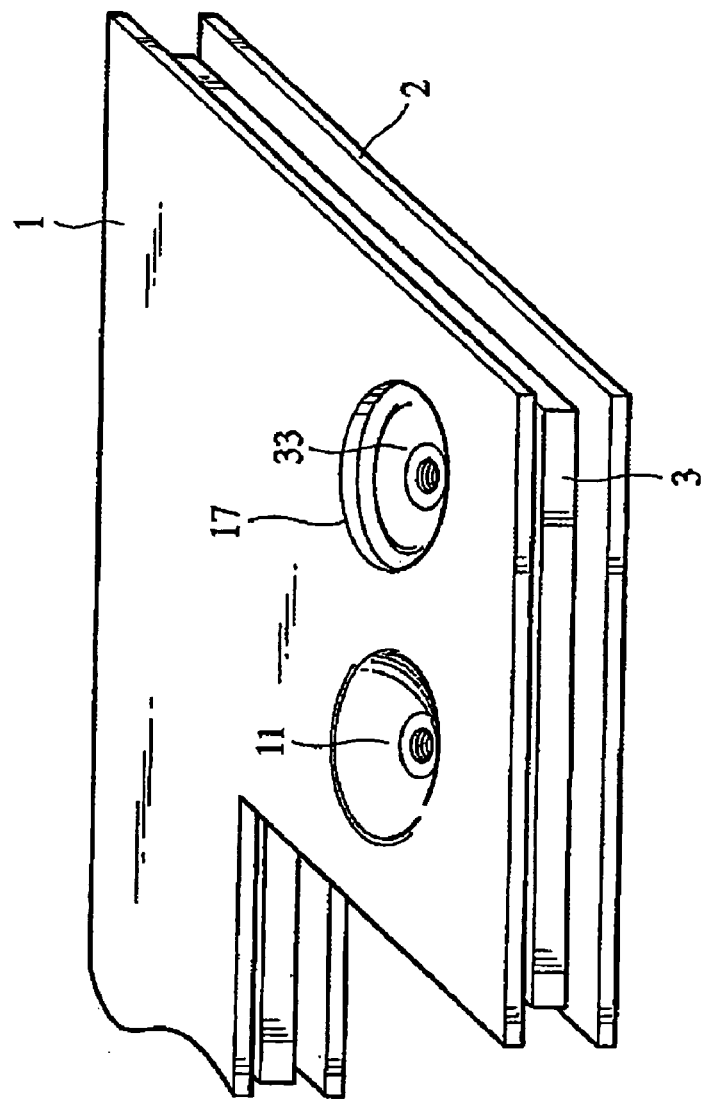
FIG. 8 is a perspective view of a modified connection portion of the distribution line structure.

According to the structure shown in FIG. 8, the connection portion 33 of the second conductor 3 is substantially covered by the first conductors 1 and 2 so that electromagnetic wave radiation is effectively suppressed. Though the edges of the second conductor 3 appear to be slightly receded from the edges of the first conductors 1 and 2 in FIG. 8, the first and second conductors 1, 2 and 3 may be constituted in another manner as described later.

Figure 9:
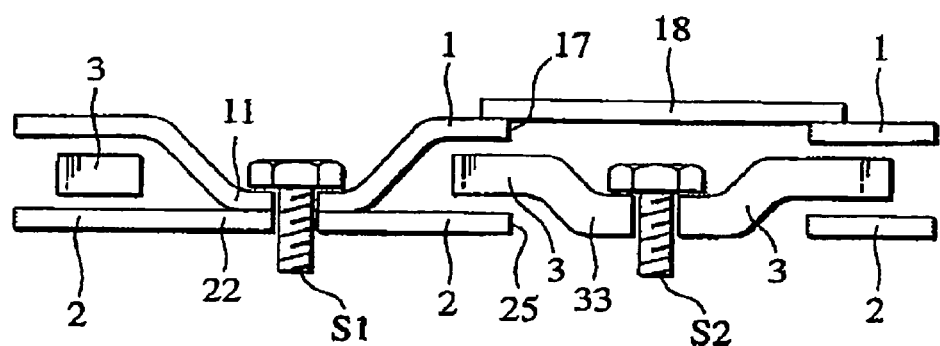
FIG. 9 is a cross-sectional view of the modified connection portion in which the insulator layers are not shown.

FIG. 9 shows a cross section of the structure of the connection portions 11, 22 and 33. The first conductors 1 and 2 are respectively provided with first connection portions 11 and 22 and the connection portion 11 is projected downward to be in contact with the connection portion 22 through a through hole of the second conductor 3 so as not to touch with the second conductor 3. The first connection portions 11 and 22 are provided with a screw hole to which a screw S1 is inserted so as to connect with an auxiliary apparatus. The first conductors 1 and 2 are provided with through holes so that a vicinity of a screw hole of the connection portion 33 is exposed. A screw S2 is inserted into the screw hole of the connection portion 33 so as to connect with the auxiliary apparatus. As the auxiliary apparatus, a power semiconductor module or a capacitor for a ripple filter is exemplified. An edge structure described later may be applied to the edges of the throughholes so as to suppress electromagnetic wave radiation. For example, the through hole of the first conductor 1 is covered with an additional conductor 18 as shown in FIG. 9, (not shown in FIG. 8) like as a fourth embodiment described later. The additional conductor 18 is electrically connected with the first conductor 1 so that electromagnetic wave radiation is suppressed.

Figure 10:
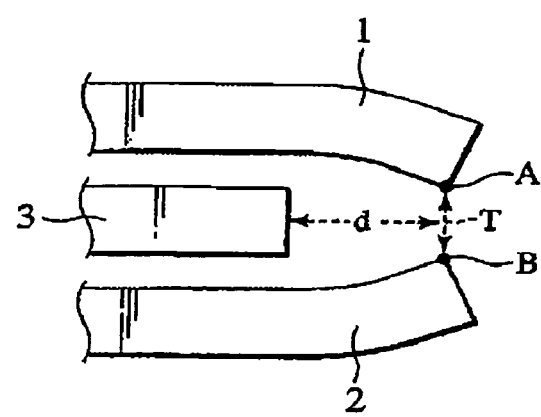
FIG. 10 is a cross-sectional view of a first modified edge structure in which the insulator layers are not shown.

A further modification of the first embodiment is shown in FIG. 10. The edges of the first conductors 1 and 2 are slightly bent toward each other. When the above described ratio K is calculated assuming that a distance between nearest points A, B thereof is T and a distance between the second conductor 3 and a line connecting A and B is d, a relative electric field is substantially as same as the above calculated one. Thereby it is possible to gain K value so as to suppress electromagnetic wave radiation as the distance between the first conductors 1 and 2 are kept constant.

Figure 11:
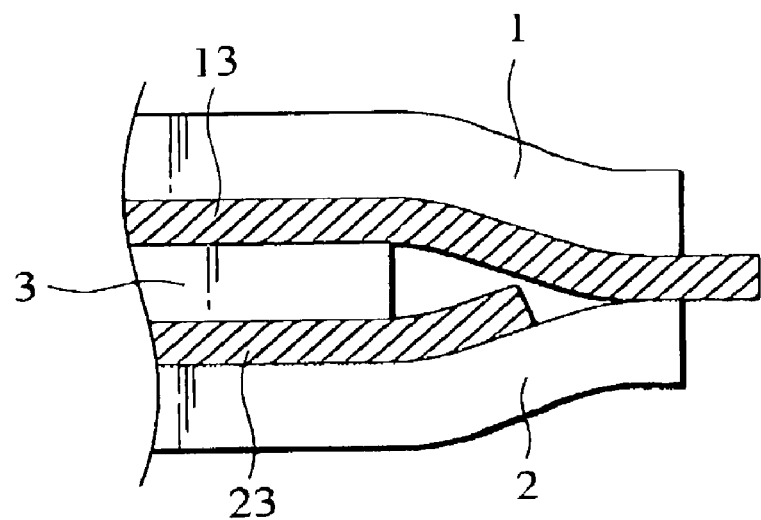
FIG. 11 is a cross-sectional view of a second modified edge structure.

For example, when the first and second conductors 1, 2 and 3 are arranged so as to set K value to 1, the value is easy to be gained up to 2 by slightly bending the edges thereof and the electric field intensity falls down to $\frac{1}{10}$ of the case of K=1. The insulator layers 13 and 23 are not given an excessive bending stress because the edges are only slightly bent. More preferably, the edges of the first conductors 1 and 2 are bent in 'S' letter shape as shown in FIG. 11. Thereby it is possible to increase K values as keeping lengths of the edges of the insulator layers 13 and 23 without an excessive bending stress thereon.

Figure 12:
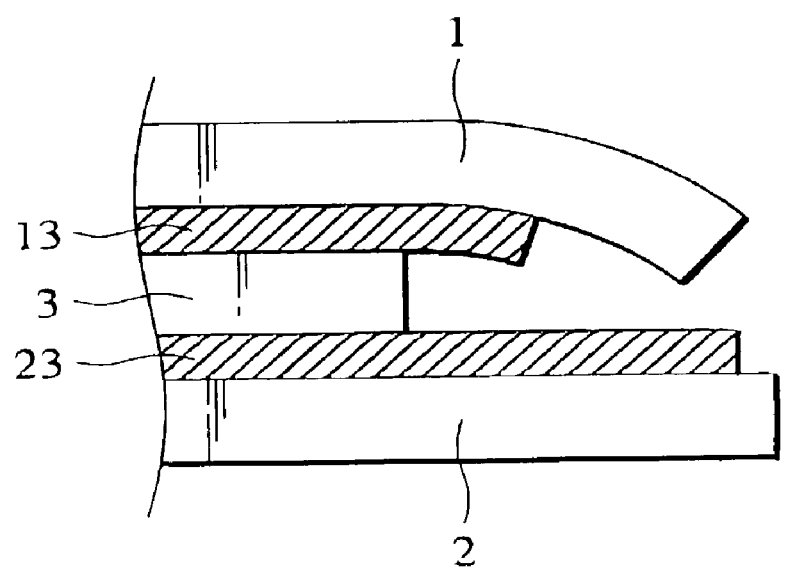
FIG. 12 is a cross-sectional view of a third modified edge structure.

As another modification, it is preferable that one of the first conductors is bent, more preferably, bent in 'S' letter shape, and another is kept straight as shown in FIG. 12. Such a bending working is achieved by a general press-working or a general sheet metal processing.

Figure 13:
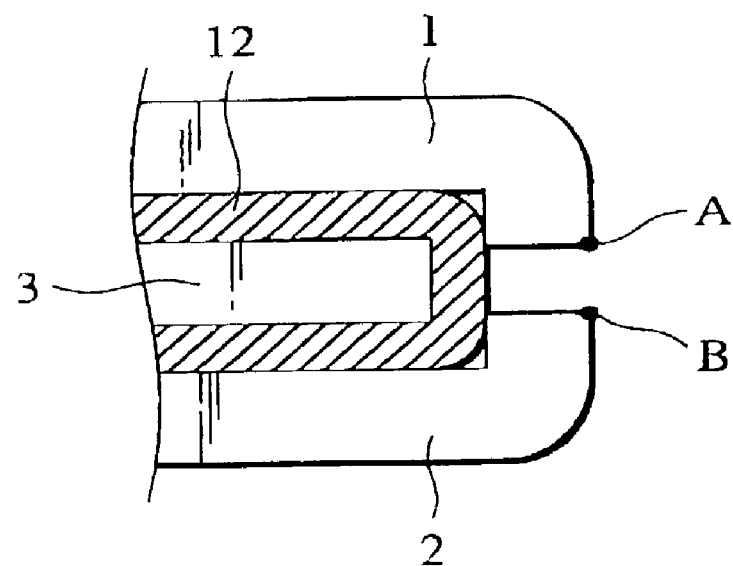
FIG. 13 is a cross-sectional view of a fourth modified edge structure.

In a case where some material which is not sensitive to a bending stress, such as a flexible resin tape or a molding resin, is applied to an insulator layer, the bending described above may be in a smaller curvature radius. Such bent conductors having very small curvature radius are shown in FIG. 13, in which the first conductors 1 and 2 are both bent in an angular shape and the insulator layer 12 is made of a flexible insulator tape. The points A, B are in such a closed manner, thereby the width of the conductors may be formed more compact.

Figure 14:
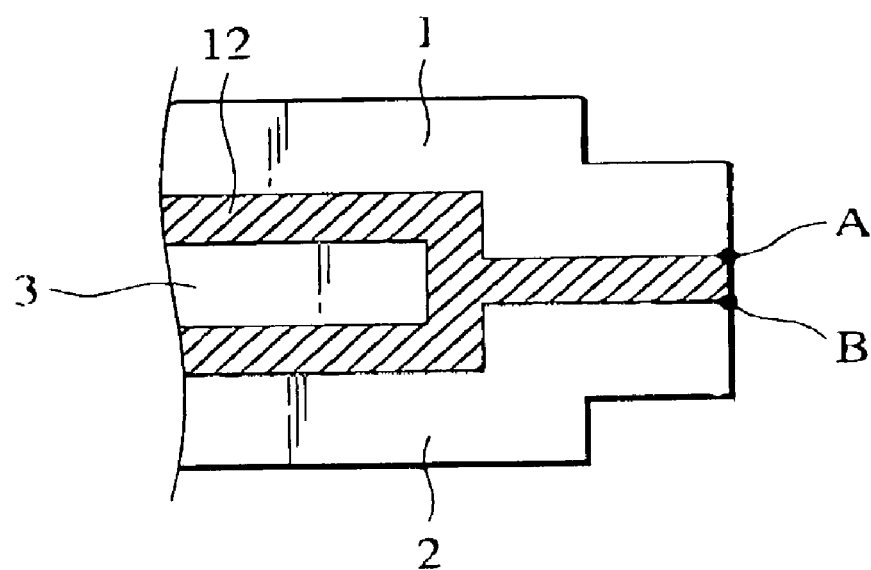
FIG. 14 is a cross-sectional view of a fifth modified edge structure.

FIG. 14 shows another modified structure in which the insulator layer 12 is made of a molding resin. The points A, B are closely arranged to considerably increase K value so that electromagnetic wave radiation is effectively suppressed.

Figure 15:
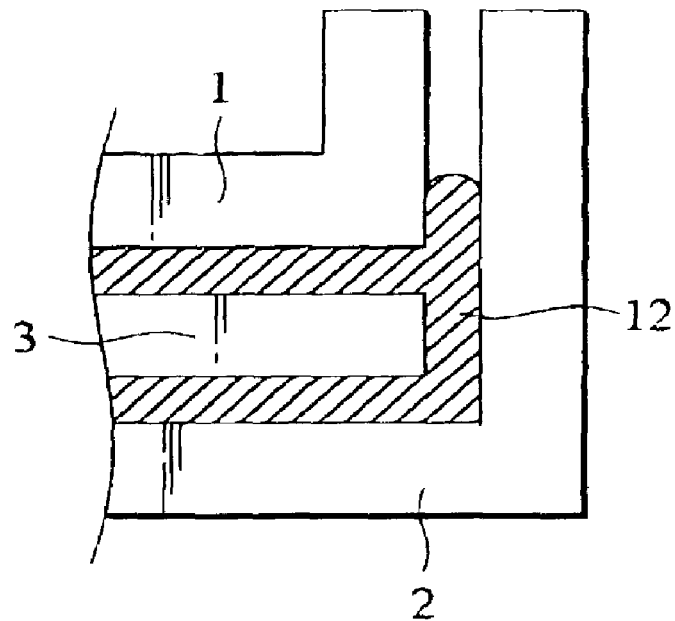
FIG. 15 is a cross-sectional view of a sixth modified edge structure.

The structure described above may be further modified to be an embedded structure as shown in FIG. 15. The bent edge portion of the first conductor 2 is slightly elongated and the first conductor 1 is embedded therein. A molding resin is molded in gaps between the conductors 1, 2 and 3 to be an insulator layer 12. The structure has an advantage that an alignment of the conductors 1, 2 and 3 can be easily achieved.

Figure 16:
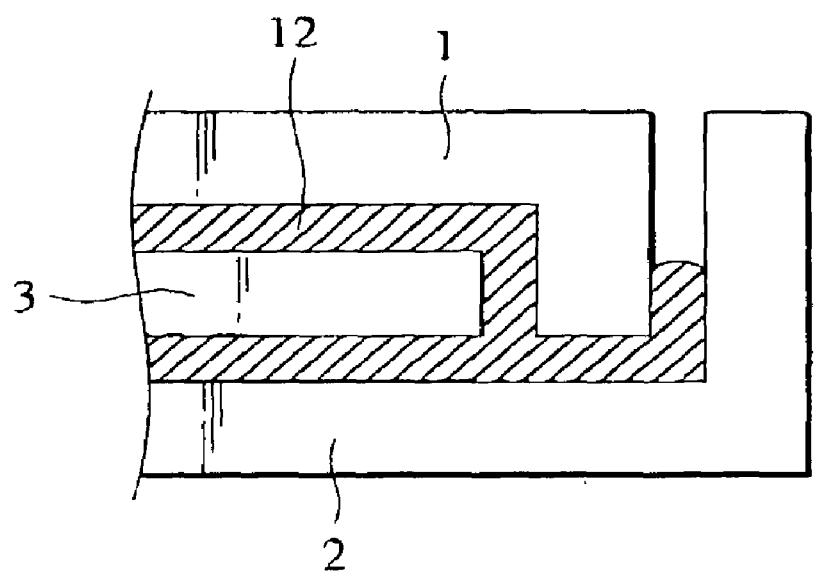
FIG. 16 is a cross-sectional view of a seventh modified edge structure.
Figure 17:
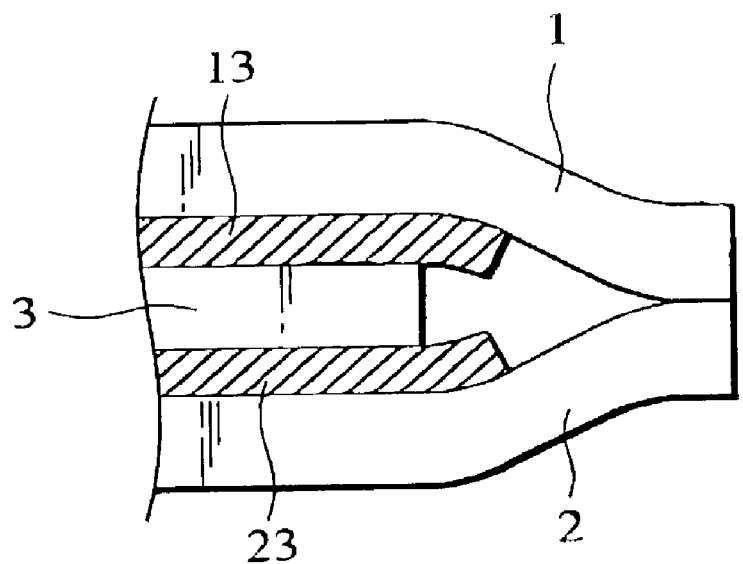
FIG. 17 is a cross-sectional view of an eighth modified edge structure.
Figure 18:
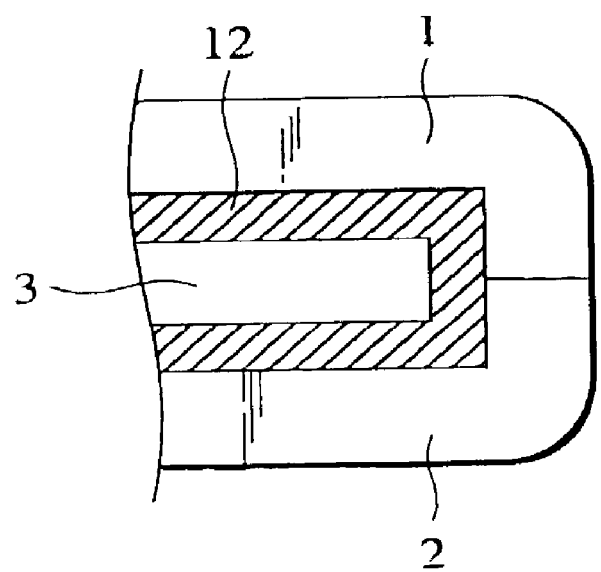
FIG. 18 is a cross-sectional view of a ninth modified edge structure.
Figure 19:
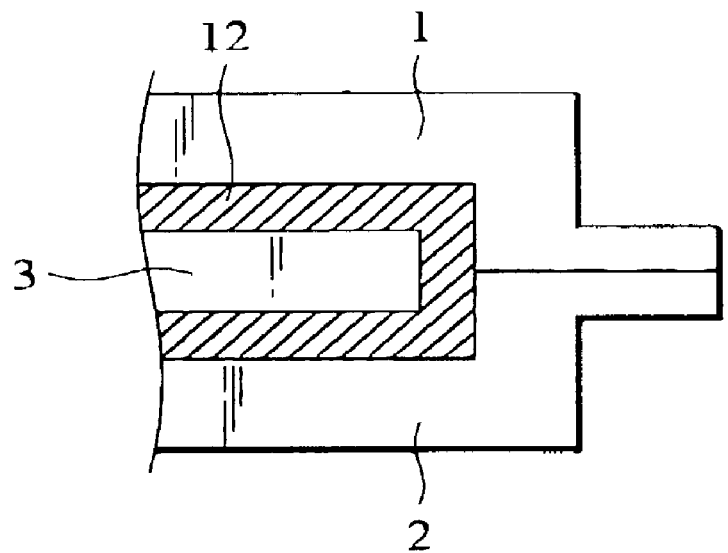
FIG. 19 is a cross-sectional view of a tenth modified edge structure.
Figure 20:
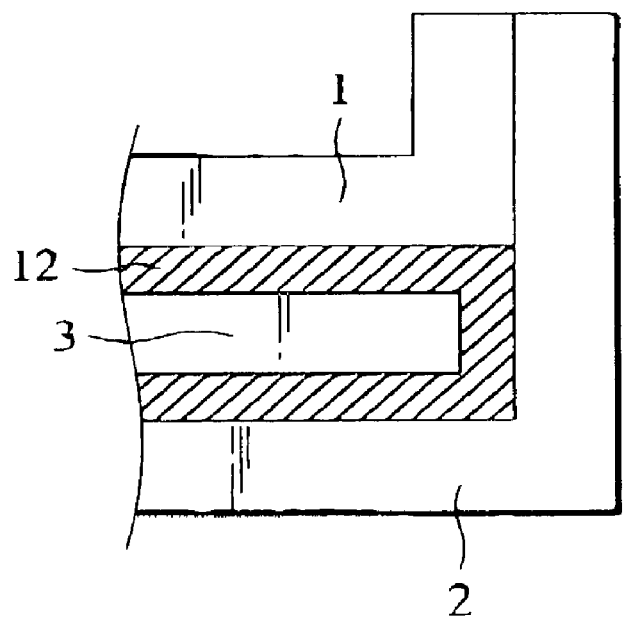
FIG. 20 is a cross-sectional view of a eleventh modified edge structure.
Figure 21:
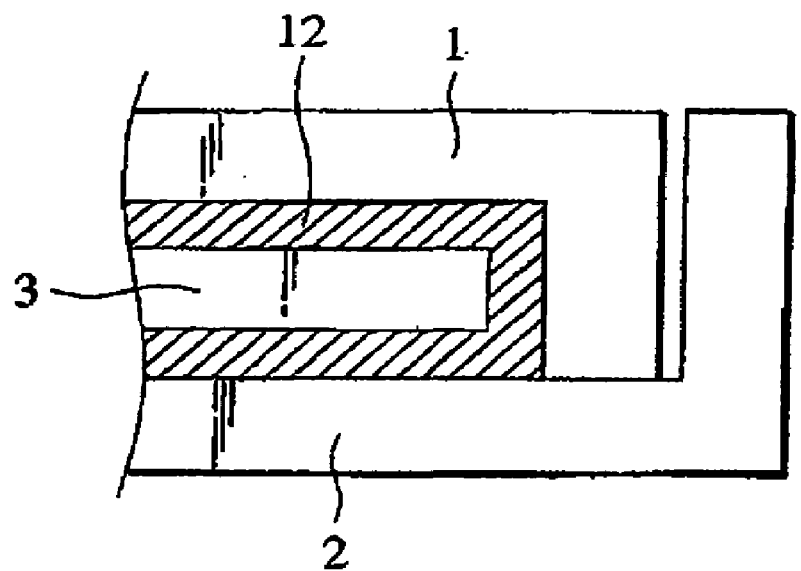
FIG. 21 is a cross-sectional view of a twelfth modified edge structure.

The edge of the first conductor 1 may be bent downward as shown in FIG. 16. The structure gives a considerably large K value.

The first conductors 1 and 2 may be in contact or welded with each other. Such structures are exemplified in FIGS. 17–21.

Figure 22:
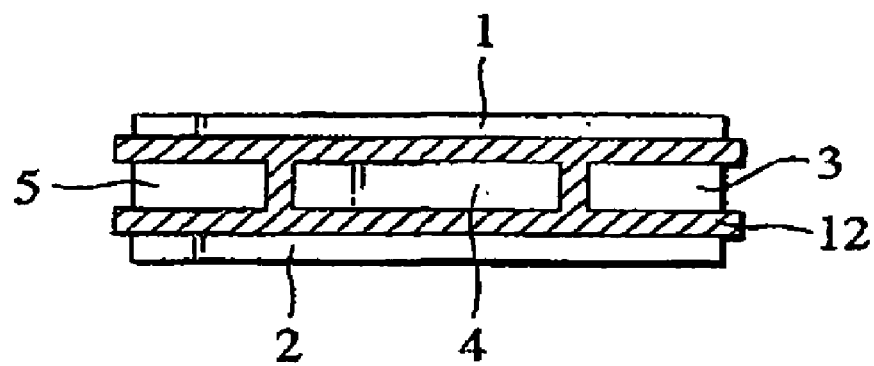
FIG. 22 is a cross-sectional view of a distribution line structure according to a second embodiment of the present invention.

A second embodiment of the present invention will be described hereinafter with reference to FIGS. 22–24.

The distribution line structure is provided with a pair of first conductors 1 and 2, second conductors 3 and 5 and a third conductor 4. All the conductors 1–5 are made of conductive material such as copper and are formed in flat strips. The second and third conductors 3–5 are sandwiched between the first conductors 1 and 2. The third conductor 4 is positioned in a center and the second conductors 3 and 5 are aligned on both sides thereof. An insulator layer 12 is put between the first, second and third conductors 1–5. Though FIG. 22, shows the insulator layer 12 as being integrally formed, the insulator layer 12 may be separated into several insulator sheets.

A current may be conducted on any pair of conductors selected from the first, second and third conductors. For example, when the third conductor 4 conducts a current, the first conductors 1 and 2 may conduct a counter current. In such a case, the first and third conductors 1, 2 and 4 are equivalent to the first and second conductors according to the first embodiment described above so that electromagnetic wave radiation is effectively suppressed.

The second conductors 3 and 5 may conduct the counter current instead of the first conductors 1 and 2. In this case, though a weak electromagnetic wave may be radiated in a direction perpendicular to surfaces of the second and third conductors 3, 4 and 5, the radiated electromagnetic wave is consumed as eddy currents on the first conductors 1 and 2. Thereby the electromagnetic wave radiation out of the distribution line structure is effectively suppressed.

Edge portions of the first and second conductors 1, 2, 3 and 5 may be modified so as to further suppress electromagnetic wave radiation like as the first embodiment.

Further, the cross-sectional areas or the conductors may be optimized like as the first embodiment. Namely, the total cross-sectional area of the first conductors 1 and 2 may be substantially the same as both the cross-sectional area of the third conductor 4 and the total cross-sectional area of the second conductors 3 and 5.

A third embodiment of the present invention will be described hereinafter with reference to FIGS. 23 and 24.

Figure 23:
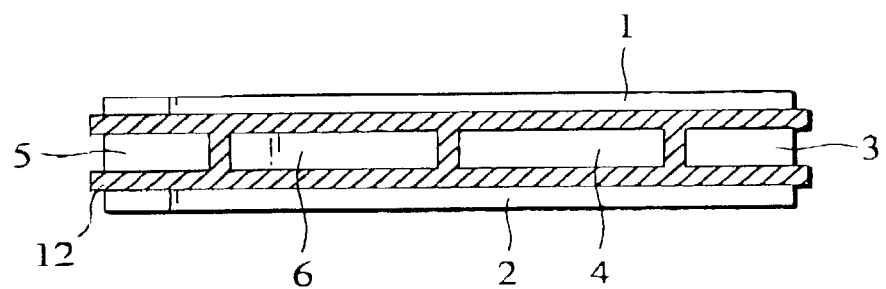
FIG. 23 is a cross-sectional view of a distribution line structure according to a third embodiment of the present invention.

The distribution line structure is provided with a pair of first conductors 1 and 2, second conductors 3 and 5, a third conductor 4 and a fourth conductor 6 as shown in FIG. 23. All the conductors 1–6 are made of a conductive material such as copper and are formed in flat strips. The second, third and fourth conductors 3–6 are sandwiched between the first conductors 1 and 2. The third and fourth conductor 4 and 6 are positioned side by side and the second conductors 3 and 5 are aligned on both sides thereof.

An insulator layer 12 is put between the first, second, third and fourth conductors 1–6, Though FIG. 23 shows the insulator layer 12 as being integrally formed, the insulator layer 12 may be separated into several insulator sheets.

Figure 24:
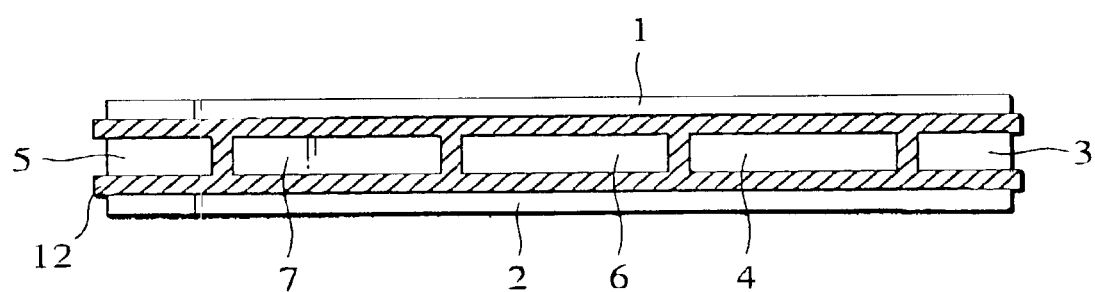
FIG. 24 is a cross-sectional view of a distribution line structure according to a modification of the third embodiment of the present invention.

A conductor may be further added to the distribution line structure as shown in FIG. 24, in which a fifth conductor 7 is put in the distribution line structure.

Edge portions of the first and second conductors 1, 2, 3 and 5 may be modified so as to further suppress electromagnetic wave radiation like as the first and second embodiments.

According to the third embodiment, the distribution line structure can conduct plural pairs of currents and counter currents independently without considerable radiation of electromagnetic waves.

Figure 25:
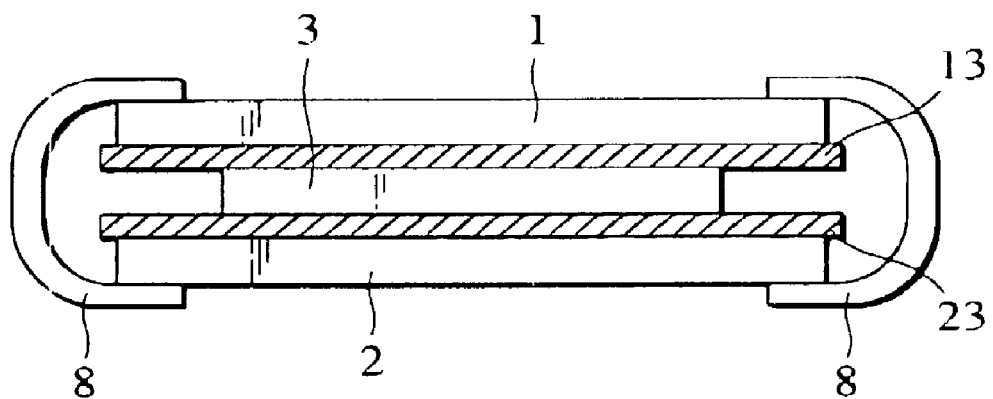
FIG. 25 is a cross-sectional view of a distribution line structure according to a fourth embodiment of the present invention.
Figure 26:
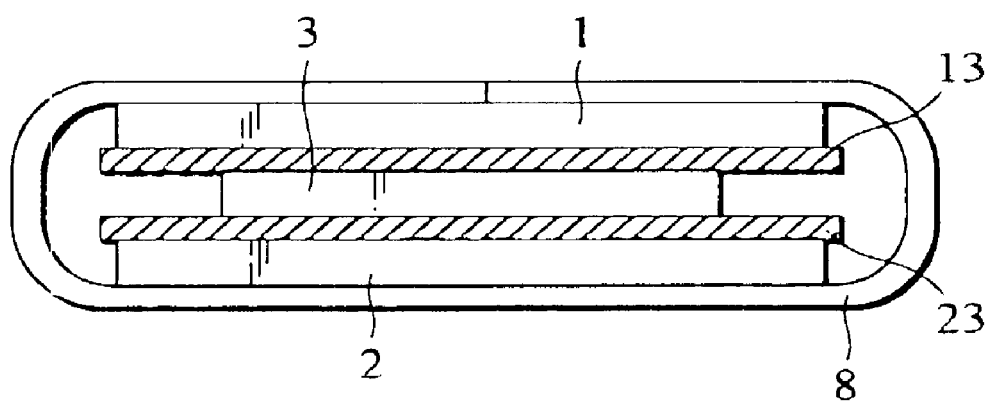
FIG. 26 is a cross-sectional view of a distribution line structure according to a modification of the fourth embodiment of the present invention.

A fourth embodiment of the present invention will be described hereinafter with reference to FIGS. 25 and 26.

The distribution line structure includes the same structure as one of those described former and is further provided with one or more additional conductors 8. FIG. 25 shows that a pair of additional conductors 8 covers both side edges of the first and second conductors 1, 2 and 3. FIG. 26 shows that an additional conductor 8 is wound around the distribution line structure. In either case, the first conductors 1 and 2 are connected with the additional conductor(s) 8.

The additional conductors 8 are made of a conductive material, preferably, having flexibility. Aluminium foil, metallic tape, conductive cloth made from thread like wires and such are preferably applied. The thickness of the additional conductors 8 may be decided on the basis of a skin effect which the electromagnetics teaches, and is dependent on a frequency of the electromagnetic wave to be suppressed. For example, assuming that the additional conductor 8 is made of copper and the frequency of the electromagnetic wave is about 1 MHz, the electromagnetics teaches that 0.1 mm or more thickness is necessary.

A fifth embodiment of the present invention will be described hereinafter with reference to FIGS. 27 and 28.

Figure 27:
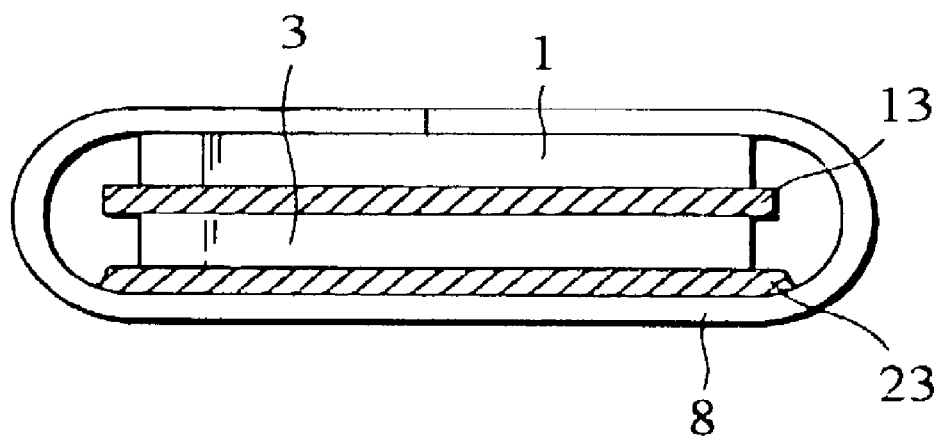
FIG. 27 is a cross-sectional view of a distribution line structure according to a fifth embodiment of the present invention.
Figure 28:
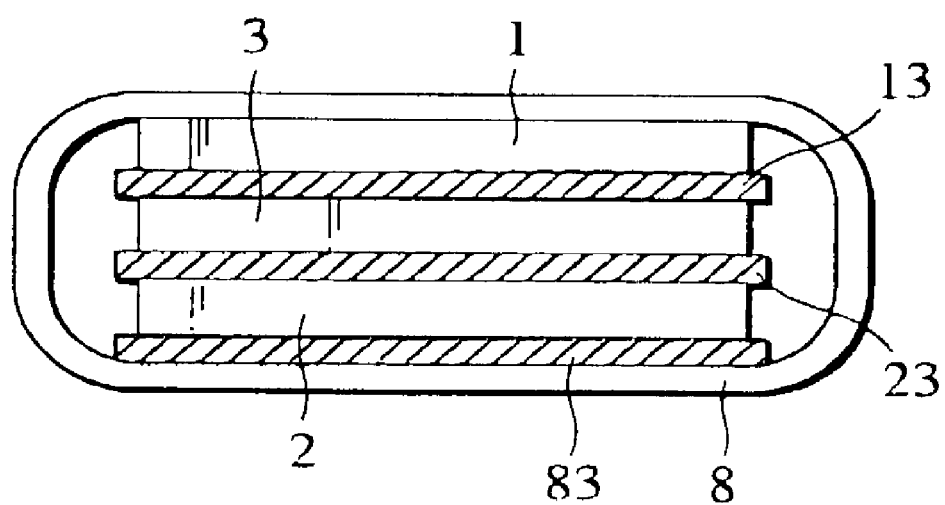
FIG. 28 is a cross-sectional view of a distribution line structure according to a modification of the fifth embodiment of the present invention.

An additional conductor 8 may enclose a pair of conductors 1 and 3, as illustrated in FIG. 27, or three conductors 1, 2 and 3 as illustrated in FIG. 28. Though the distribution line structures of the fifth embodiment resemble one of the fourth embodiment shown in FIG. 26, the additional conductor 8 is contact with only one of the first conductor 1 and is electrically insulated from the other conductors by the interposed insulators 13, 23 and 83. The thickness may also be decided on the basis of the skin depth effect described above.

The distribution line structures of the fifth embodiment have the radiation suppression effect substantially equal to one of the fourth embodiment.

The distribution line structures described above respectively have preferable applications. The preferable applications are describe hereinafter.

Figure 29:
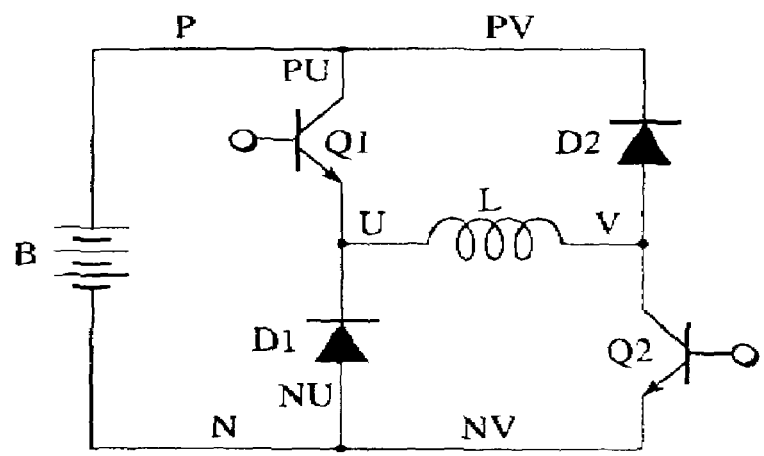
FIG. 29 is a schematic drawing of a H bridge circuit to which the present invention is applied.

FIG. 29 shows a basic circuit of a H bridge circuit which is schematically applied to a motor driver, in which Q1 and Q2 represent transistors, D1 and D2 represent diodes, U and V represent power lines connected to a load, B represents a battery and L represents an inductive load such as a DC motor. P and N respectively represent positive and negative power lines and lines PU, PV, NU and NV are branches thereof.

The transistors Q1 and Q2 are simultaneously switched. When they are switched on, electric power is supplied to the inductive load L via the lines P, PU, U, V, NV and N. The inductive load L stores electromagnetic energy while current is flowing. When the transistors Q1 and Q2 are switched off, the inductive load L generates a back electromotive force so as to pass a current back to the battery through the diodes D1 and D2. Then the current flows in a reversed direction via the lines N, NU, U, V, PV and P.

As described above, the current flow on the power lines P and N drastically changes as often as the transistors Q1 and Q2 are switched, thereby electromagnetic wave is radiated therefrom.

Figure 30:
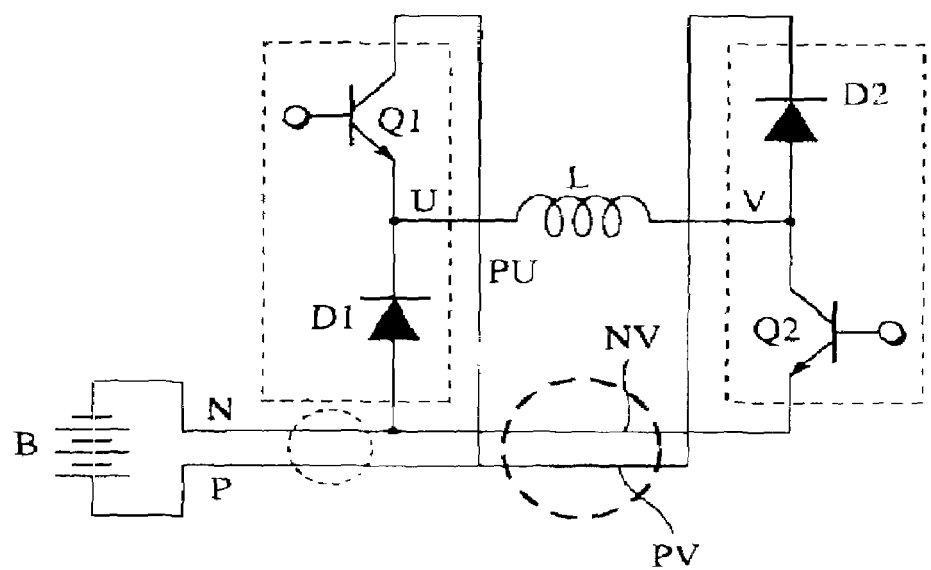
FIG. 30 is another drawing of the H bridge circuit.

The current flowing on the positive power line P is always balanced with the current on the negative power line N. Therefore the distribution line structure according to the first embodiment is successfully applied so as to suppress the electromagnetic wave radiation when the power lines P and N are mated as shown in FIG. 30. On the contrary, at a portion enclosed by a heavy broken line in FIG. 30, a current and its counter current are unpaired because a current on the line PV caused by a back electromotive force do not flow simultaneously with a current flow on the line NV.

Figure 31:
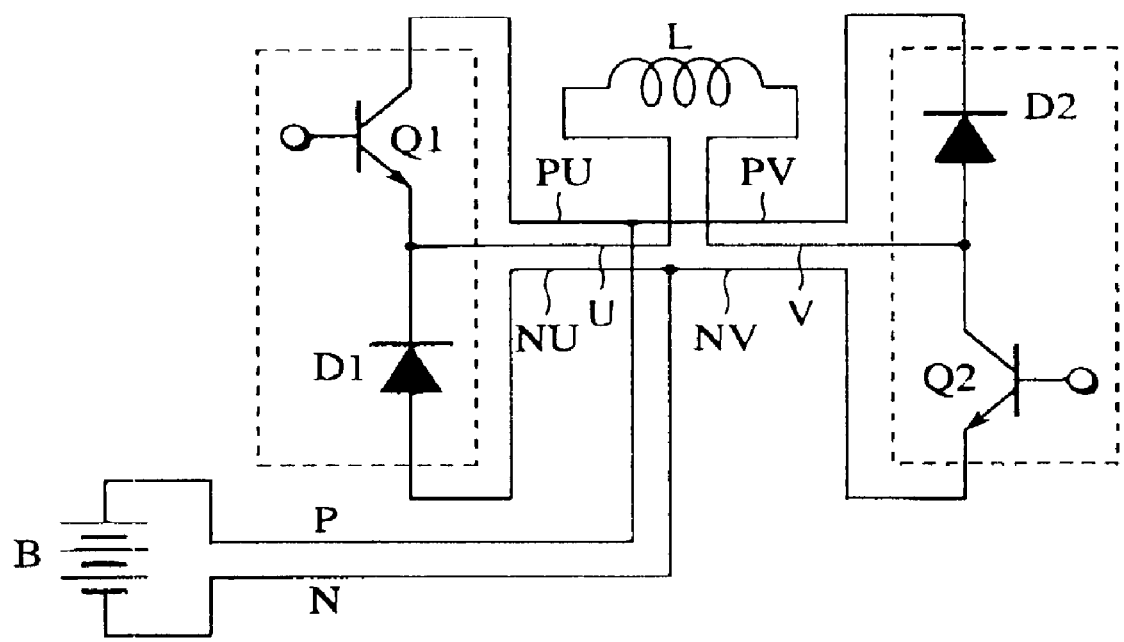
FIG. 31 is the other drawing of the H bridge circuit.

A counter current balanced with the current on the line v flows on either the line PV or the line NV. Therefore the lines V, PV and NV should be bound together and by the same reason the lines U, PU and NU should be bound together as shown in FIG. 31. The distribution line structure according to the second embodiment may be applied to the bound lines U, PU and NU and the bound lines V, PV and NV so as to suppress the electromagnetic wave radiated therefrom.

The distribution line structure according to the third embodiment is effectively applied, for example, to a multiplex bridge circuit. For example, three sets of bridge circuits are applied to driving a three-phase motor. The three-phase motor driver circuit is provided with a pair of power lines and three sets of power lines connected to the motor. These five lines may be bound together and the distribution line structure according to the third embodiment can be applied to the bound five lines so that electromagnetic wave radiation is suppressed.

The distribution line structure according to the fourth embodiment or the fifth embodiment may be applied to those circuits because the fourth and fifth embodiments are modifications of the first, the second or the third embodiment.

The contents of Japanese Patent Application No. 2001-344545 (filed on Nov. 9, 2001) are incorporated herein by reference in its entirety.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A distribution line structure for electric power supply comprising:
   a pair of first conductors, each of the first conductors including a first main portion formed in a flat strip shape and one or more first connection portions, the first conductors being connected with each other at the first connection portions; and
   a second conductor including a second main portion formed in a flat strip shape and one or more second connection portions,
   the first and second main portions being layered and separated from each other by insulators, wherein the second main portion is formed between, and does not protrude from, the first main portions.

2. A distribution line structure for a bridge circuit supplying an intermittent current from a direct current power source to a load, comprising:
   a pair of first conductors, each of the first conductors including a first main portion formed in a flat strip shape and one or more first connection portions, the first conductors being connected with each other at the first connection portions;
   a pair of second conductors, each of the second conductors including a second main portion formed in a flat strip shape and one or more second connection portions, the second conductors being connected with each other at the second connection portions; and
   a third conductor including a third main portion formed in a flat strip shape and one or more third connection portions,
   the first, second and third main portions being layered and separated from each other by insulators, wherein the second main portions are aligned on both sides of the third main portion and the second and third main portions are formed between, and do not protrude from, the first main portions,
   the first conductors and the second conductors being connected with the direct current power source, and
   the third conductor being connected with the load.

3. A distribution line structure for a bridge circuit supplying an intermittent current from a direct current power source to a load, comprising:
   a pair of first conductors, each of the first conductors including a first main portion formed in a flat strip shape and one ore more first connection portions, the first conductors being connected with each other at the first connection portions;
   a pair of second conductors, each of the second conductors including a second main portion formed in a flat strip shape and one or more second connection portions, the second conductors being connected with each other at the second connection portions; and a third conductor including a third main portion formed in a flat strip shape and one or more third connection portions, the first, second and third main portions being layered and separated from each other by insulators, wherein the second main portions are aligned on both sides of the third main portion and the second and third main portions are formed between, and do not protrude from, the first main portions, the first conductors being connected with the load, and the second conductors and third conductor being connected with the direct current power source.

4. A distribution line structure for a bridge circuit supplying an intermittent current from a direct current power source to a load, comprising:

a pair of first conductors, each of the first conductors including a first main portion formed in a flat strip shape and one or more first connection portions, the first conductors being connected with each other at the first connection portions;

a pair of second conductors, each of the second conductors including a second main portion formed in a flat strip shape and one or more second connection portions, the second conductors being connected with each other at the second connection portions; and a third conductor including a third main portion formed in a flat strip shape and one ore more third connection portions, the first, second and third main portions being layered and separated from each other by insulators, wherein the second main portions are aligned on both sides of the third main portion and the second and third main portions are formed between, and do not protrude from, the first main portions, the first conductors and the third conductor being connected with the direct current power source, and the second conductors being connected with the load.

5. A distribution line structure for a bridge circuit supplying an intermittent current from a direct current power source to a load, comprising:

a pair of first conductors, each of the first conductors including a first main portion formed in a flat strip shape and one or more first connection portions, the first conductors being connected with each other at the first connection portions;

a pair of second conductors, each of the second conductors including a second main portion formed in a flat strip shape and one or more second connection portions, the second conductors being connected with each other at the second connection portions;

a third conductor including a third main portion formed in a flat strip shape and one or more third connection portions; and a fourth conductor including a fourth main portion formed in a flat strip shape and one or more fourth connection portions, the first, second, third and fourth main portions being layered and separated from each other by insulators, wherein the third main portion and the fourth main portions are aligned side by side, the second main portions being aligned on both sides of the third and fourth main portions and the second, third and fourth main portions are formed between, and do not protrude from, the first main portions, the first conductors and the second conductors being connected with the direct current power source, and the third conductor and the fourth conductor being connected with the load.

6. A distribution line structure for a bridge circuit supplying an intermittent current from a direct current power source to a three-terminal load, comprising:

a pair of first conductors, each of the first conductors including a first main portion formed in a flat strip shape and one or more first connection portions, the first conductors being connected with each other at the first connection portions;

a pair of second conductors, each of the second conductors including a second main portion formed in a flat strip shape and one or more second connection portions, the second conductors being connected with each other at the second connection portions;

a third conductor including a third main portion formed in a flat strip shape and one or more third connection portions;

a fourth conductor including a fourth main portion formed in a flat strip shape and one or more fourth connection portions; and a fifth conductor including a fifth main portion formed in a flat strip shape and one or more fifth connection portions, the first, second, third, fourth and fifth main portions being layered and separated from each other by insulators, wherein the third, fourth and fifth main portions are aligned side by side, the second main portions are aligned on both sides of the third, fourth and fifth main portions and the second, third, fourth and fifth main portions are between the first main portions, the first conductors and the second conductors being connected with the direct current power source, and the third conductor, the fourth conductor and the fifth conductor being respectively connected with each terminal of the three-terminal load.

7. The distribution line structure of claim 1, wherein:

the second main portion comprises a through hole and the first conductors are connected with each other through the through hole, and the first main portion comprises through holes so that the second conductor sandwiched by the first conductors is exposed through the through holes.

8. A distribution line structure for electric power supply comprising:

a pair of first conductors, each of the first conductors including a first main portion formed in a flat strip shape and one or more first connection portions, the first conductors being connected with each other at the first connection portions; and a second conductor including a second main portion formed in a flat strip shape and one or more second connection portions, the first and second main portions being layered and separated from each other by insulators, wherein the second main portion is between and does not protrude from the first main portions, and wherein the second main portion is not intersected by either of two line segments, each of the line segments being connected from a point on the nearest inner edge of the other of the first main portions and a point on the respective nearest inner edges of another of the first main portions.

9. The distribution line structure of claim 8, wherein:
the distances between the second main portion and the line segments are more than ¼ times the length of the line segments.

10. The distribution line structure of claim 8, wherein:
edge portions of either or both of the first main portions are bent toward the opposite first main portion.

11. The distribution line structure of claim 8, wherein:
edge portions of either or both of the first main portions are bent toward the opposite first main portion and the lengths of the line segments are zero.

12. The distribution line structure of claim 1, wherein:
the total cross-sectional area of the first main portions is not larger than the cross-sectional area of the second main portion.

13. The distribution line structure of claim 2, wherein:
the total cross-sectional area of the first main portions is not larger than the total cross-sectional area of the third main portions, and the total cross-sectional area of the second main portions is not larger than the total cross-sectional area of the third main portions.

14. The distribution line structure of claim 1, further comprising:
additional conductors covering side edges of the first main portions, the additional conductors being connected with either or both of the first main portions.

15. A distribution line structure for electric power supply comprising:
a first conductor including a first main portion formed in a flat strip shape and one or more first connection portions;
a second conductor; and
a third conductor including a third main portion formed in a flat strip shape and one or more third connection portions,
the first and third main portions being layered,
the second conductor enfolding the third main portion so as to be connected with the first main portion, and
the third conductor being separated from the first conductor and the second conductor by insulators.

16. A distribution line structure for a bridge circuit supplying an intermittent current from a direct current power source to a load, comprising:
a first conductor including a first main portion formed in a flat strip shape and one or more first connection portions;
a second conductor;
a third conductors including a third main portion formed in a flat strip shape and one or more third connection portions; and
a fourth conductor including a fourth main portion formed in a flat strip shape and one or more fourth connection portions,
the first, third and fourth main portions being layered and separated from each other by insulators,
the second conductor enfolding the third and fourth main portions so as to be connected with the first main portion,
the first conductor, the second conductor and the fourth conductor being connected with the direct current power source, and
the third conductor being connected with the load.

17. The distribution line structure of claim 14, wherein:
the additional conductors are conductive thin films, conductive mesh-like thin films or aggregations of conductive threads.

18. The distribution line structure of claim 15, wherein:
the second conductor is a conductive thin film, a conductive mesh-like thin film or an aggregation of conductive threads.

* * * * *